United States Patent
Huang et al.

[11] Patent Number: 6,163,087
[45] Date of Patent: Dec. 19, 2000

[54] POWER SUPPLYING SYSTEM WITH A DELAYED CLOSING DEVICE FOR DELAYED CLOSING OF A HEAT-DISSIPATING FAN

[75] Inventors: Yung-Hsin Huang; Chien-Hua Liao, both of Taipei Hsien, Taiwan

[73] Assignee: Shin Jiuh Corp., Taiwan

[21] Appl. No.: 09/245,012

[22] Filed: Feb. 4, 1999

[30] Foreign Application Priority Data

Dec. 19, 1998 [TW] Taiwan .................................. 87221197

[51] Int. Cl.[7] .................................. H02J 7/00; H02J 9/00
[52] U.S. Cl. .............................................................. 307/64
[58] Field of Search ........................... 307/23, 64; 315/86; 340/333; 361/24, 28, 103

[56] References Cited

U.S. PATENT DOCUMENTS

| | | | |
|---|---|---|---|
| 4,756,473 | 7/1988 | Takemae et al. | 236/49 |
| 5,640,059 | 6/1997 | Kammiller et al. | 307/66 |
| 5,969,436 | 10/1999 | Chalasani et al. | 307/64 |

*Primary Examiner*—Stephen W. Jackson
*Assistant Examiner*—Andre Henry
*Attorney, Agent, or Firm*—Brinks Hofer Gilson & Lione

[57] ABSTRACT

A power supplying system includes a switching control circuit connected to a stand-by power source so as to receive electrical power therefrom. The switching control circuit is further connected to a power-supplying unit and is activated to control operation of the power-supplying unit in a selected one of an ON state, where the power-supplying unit supplies electrical power for operating a heat-dissipating fan, and an OFF state, where the power-supplying unit ceases to supply the electrical power to the heat-dissipating fan. A delayed closing device receives a power-OFF signal from the power-supplying unit at an instant the power-supplying unit is operated from the ON state to the OFF state, and connects the heat-dissipating fan to the stand-by power source upon receiving the power-OFF signal to enable the heat-dissipating fan to receive electrical power from the stand-by power source and permit continued operation of the heat-dissipating fan even after the heat-dissipating fan ceases to receive the electrical power from the power-supplying unit.

13 Claims, 4 Drawing Sheets

POWER SUPPLYING SYSTEM WITH A DELAYED CLOSING DEVICE FOR DELAYED CLOSING OF A HEAT-DISSIPATING FAN

BACKGROUND OF THE INVENTION

1. Field of the Invention

The invention relates to a power supplying system, more particularly to one with a delayed closing device for delayed closing of a heat-dissipating fan.

2. Description of the Related Art

Electronic equipment, such as a desktop computer or an uninterruptible power system (UPS), incorporates a power supplying system to provide electrical power needed to operate the equipment. FIG. 1 illustrates a conventional power supplying system installed in a desktop computer. When the user operates a power switch on the desktop computer to operate the latter, a power-supplying unit 1 is activated so that a 110-volt alternating current (AC) input from an electrical outlet is supplied to an input rectifying and filtering circuit 10 to obtain a rectified and filtered 300-volt direct current (DC) signal. A switching unit 11 converts the 300-volt DC signal into a ±150-volt square wave signal. An isolation power transformer 12 reduces the output of the switching unit 11 to ±5 volts or ±12 volts. The output of the isolation power transformer 12 is filtered and rectified by an output rectifying and filtering circuit 13 before being supplied to a heat-dissipating fan 14 and to other electronic components of the desktop computer. As such, when the power-supplying unit 1 is activated, electrical power is supplied to the various electronic components of the desktop computer to operate the latter, and the heat-dissipating fan 14 is turned on to dissipate the heat that is generated due to the operation of the power-supplying unit 1 and the desktop computer. The output rectifying and filtering circuit 13 is further connected to a pulse width modulation (PWM) control circuit 15 that, in turn, is connected to the switching unit 11. The PWM control circuit 15 controls operation of the switching unit 11 to ensure that the power-supplying unit 1 will provide a stable output. When the user operates the power switch on the desktop computer to deactivate the latter, the AC input of the power-supplying unit 1 is cut-off, thereby disabling the power-supplying unit 1. The heat-dissipating fan 14 is also turned off at this time.

The following drawback arises from the aforementioned design: When the power-supplying unit 1 is turned off abruptly after operating for a period of time, a continued rise in the ambient temperature of the electronic components of the power-supplying unit 1 and the desktop computer will be experienced. Because the heat-dissipating fan 14 is already turned off, heat cannot be dissipated immediately, thereby resulting in prolonged exposure of the electronic components of the power-supplying unit 1 and the desktop computer to high ambient temperature conditions. This can result in shorter service lives for the electronic components of the power-supplying unit 1 and the desktop computer and in lower reliability.

FIG. 2 illustrates a conventional power supplying system for an ATX personal computer. Unlike the power supplying system of FIG. 1, the power-supplying unit 2 is further connected to a stand-by power source 23 and a remote switching control circuit 24. The stand-by power source 23 includes a switching and isolating circuit 230 and an output circuit 231. When the power-supplying unit 2 is activated, aside from processing the AC input for supplying the electrical power needed to operate the heat-dissipating fan 22 and the various electronic components of the ATX personal computer, the power-supplying unit 2 further provides the AC input to the stand-by power source 23. The stand-by power source 23 provides electrical power needed to operate the remote switching control circuit 24, and is connected to the motherboard (not shown) of the ATX personal computer. The motherboard is connected to a remote switch (not shown), such as a keyboard or a modem. When the remote switch input is at a high logic state, the remote switching control circuit 24 will control the PWM control circuit 210 of the power-supplying unit 2 to a remote OFF state, whereby the power-supplying unit 2 ceases to supply electrical power to the various electronic components of the ATX personal computer, and the heat-dissipating fan 22 is turned off. The stand-by power source 23 continues to operate at this time to supply the electrical power needed by the remote switching control circuit 24. When the remote switch input changes to a low logic state, the remote switching control circuit 24 will control the PWM control circuit 210 of the power-supplying unit 2 to a remote ON state, whereby the power-supplying unit 2 resumes the supply of electrical power to the various electronic components of the ATX personal computer, and the heat-dissipating fan 22 is once again turned on. The conventional power-supplying system of FIG. 2 has the following drawback during use: When the remote switch is activated to operate the power-supplying unit 2 in the remote OFF state, the power-supplying unit 2 ceases to generate electrical power for activating the heat-dissipating fan 22. Thus, a continued rise in the ambient temperature of the electronic components of the power-supplying unit 2 and the ATX personal computer will be experienced at the instant of operating the power-supplying unit 2 in the remote OFF state. This situation is aggravated due to the continued operation of the stand-by power source 23. Because the heat-dissipating fan 22 is already turned off, heat cannot be dissipated immediately, thereby resulting in prolonged exposure of the electronic components of the power-supplying unit 2 and the ATX personal computer to high ambient temperature conditions that can lead to shorter service lives for the electronic components of the power-supplying unit 2 and the ATX personal computer and lower reliability.

SUMMARY OF THE INVENTION

Therefore, the main object of the present invention is to provide a power supplying system with a delayed closing device for delayed closing of a heat-dissipating fan to prolong the service lives and increase the reliability of electronic components within the vicinity of the heat-dissipating fan.

According to this invention, a power supplying system comprises a power-supplying unit, a heat-dissipating fan connected to the power-supplying unit, a stand-by power source, and a switching control circuit connected to the stand-by power source so as to receive electrical power therefrom. The switching control circuit is further connected to the power-supplying unit and is adapted to be activated to control operation of the power-supplying unit in a selected one of an ON state, where the power-supplying unit supplies electrical power for operating the heat-dissipating fan, and an OFF state, where the power-supplying unit ceases to supply the electrical power to the heat-dissipating fan. A delayed closing device is connected to the power-supplying unit, the heat-dissipating fan and the stand-by power source. The delayed closing device receives a power-OFF signal from the power-supplying unit at an instant the power-supplying unit is operated from the ON state to the OFF state. The delayed closing device connects the heat-dissipating fan to the stand-by power source upon receiving the power-OFF signal to enable the heat-dissipating fan to receive electrical power from the stand-by power source and permit continued operation of the heat-dissipating fan even after the heat-dissipating fan ceases to receive the electrical power from the power-supplying unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
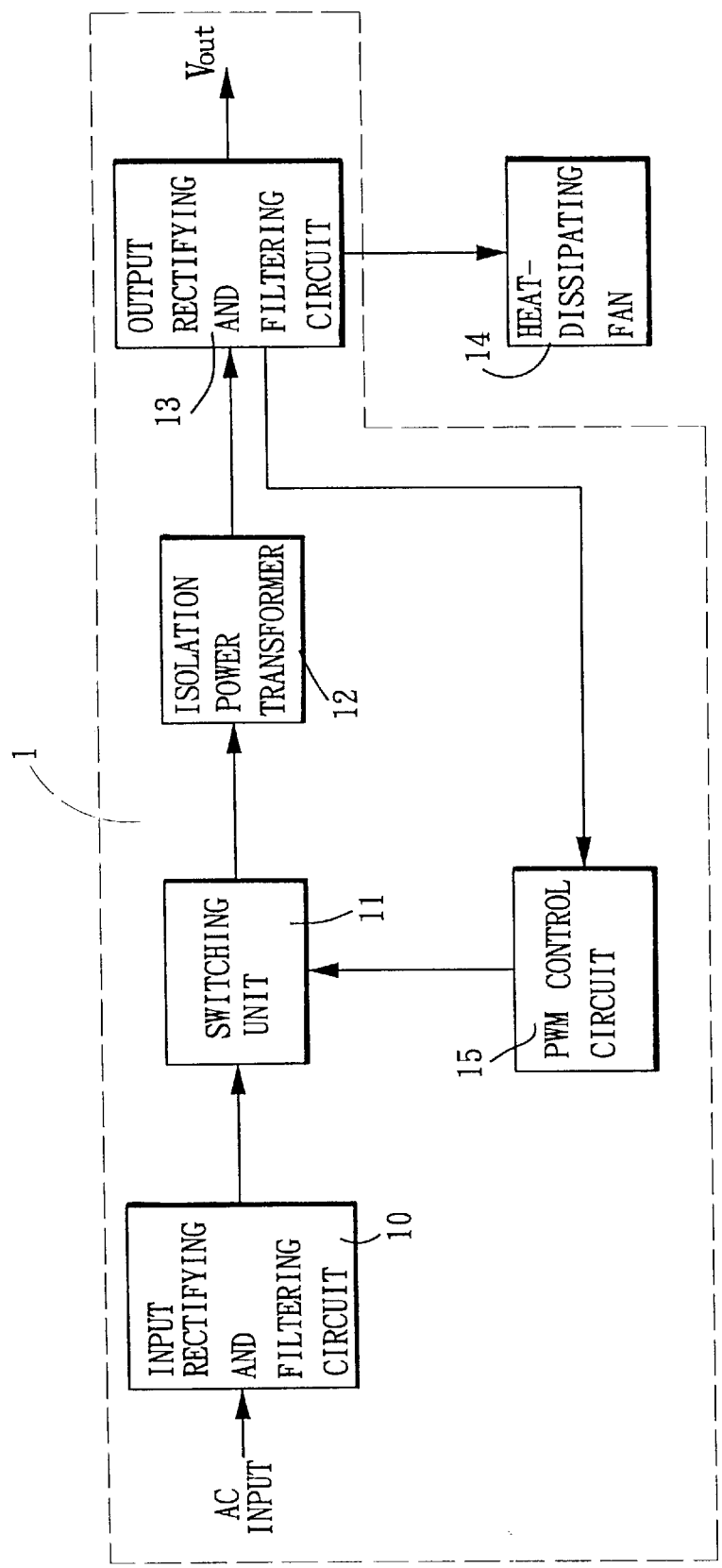
FIG. 1 is a schematic circuit block diagram illustrating a conventional power supplying system for a desktop computer.
Figure 2:
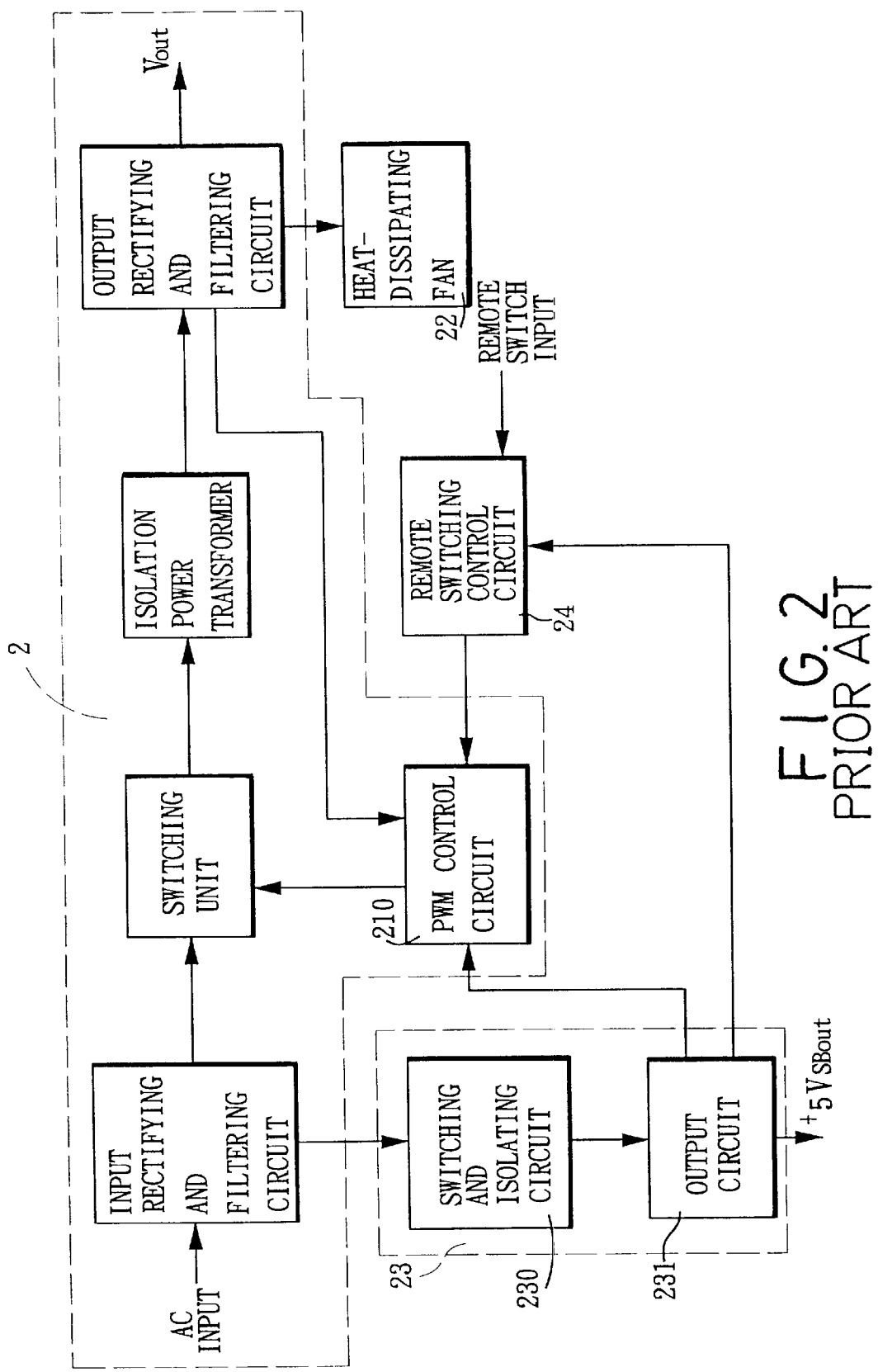
FIG. 2 is a schematic circuit block diagram illustrating a conventional power supplying system for an ATX personal computer.
Figure 3:
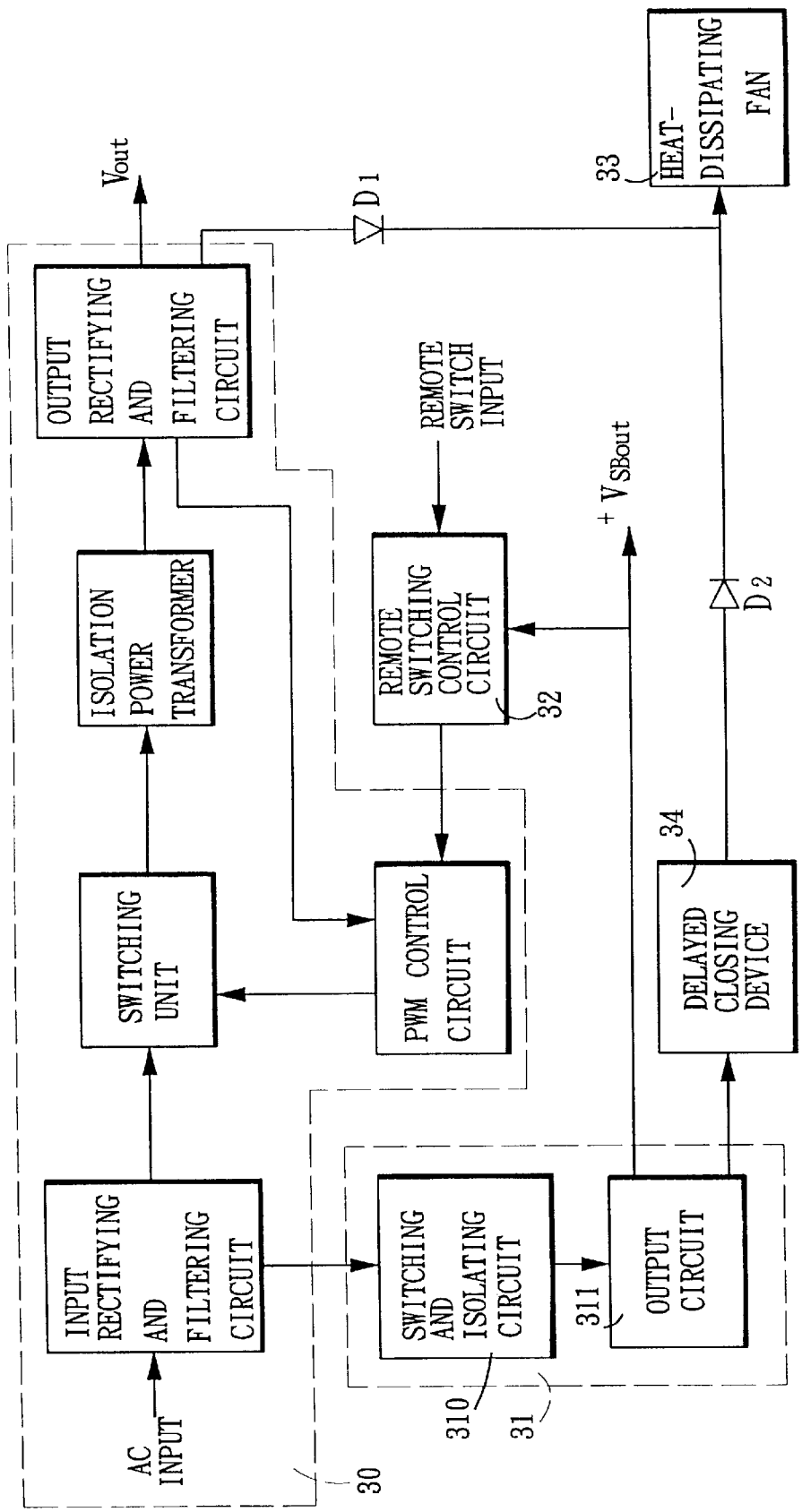
FIG. 3 is a schematic circuit block diagram illustrating the preferred embodiment of a power supplying system that incorporates a delayed closing device according to the present invention.
Figure 4:
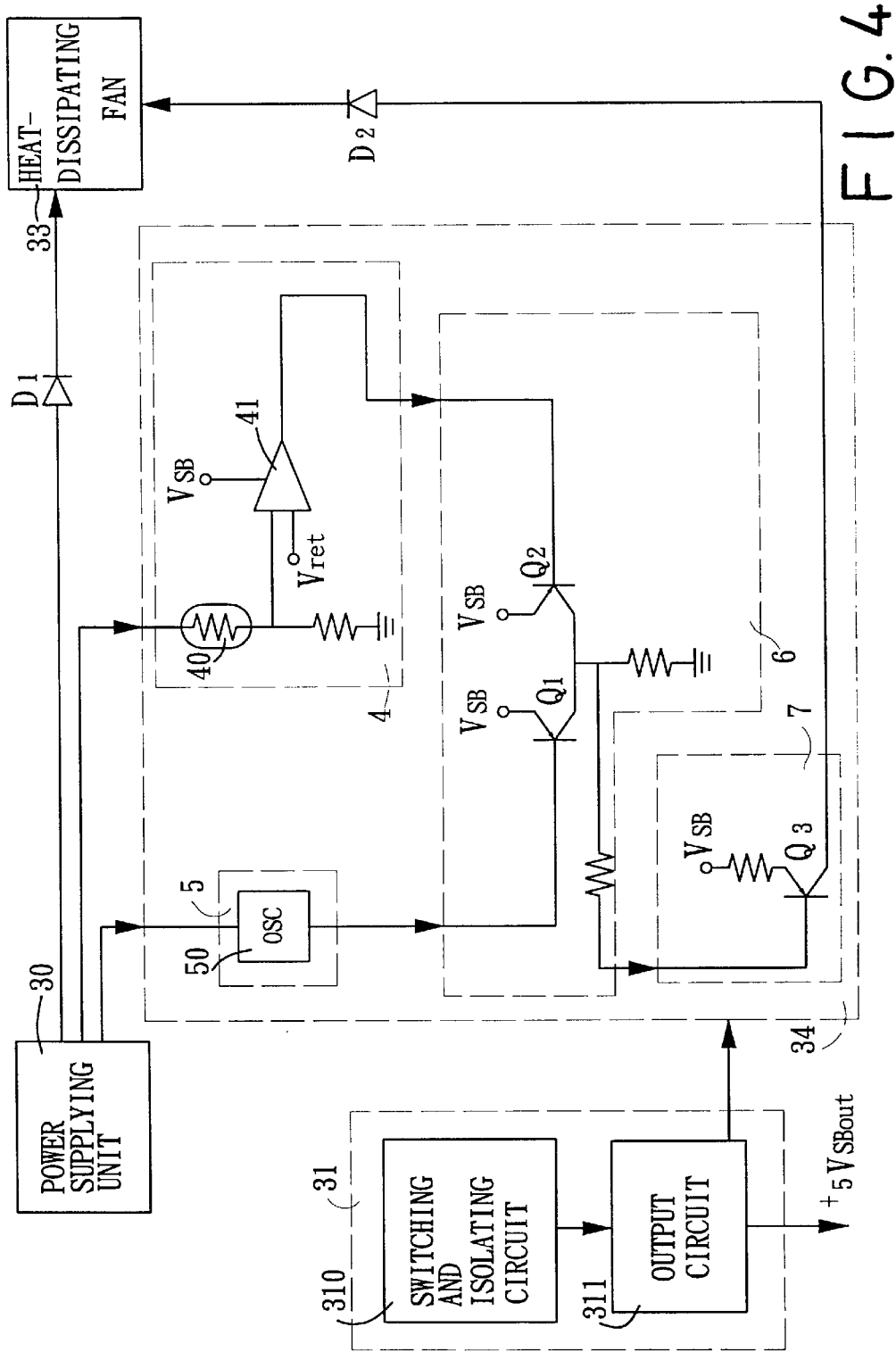
FIG. 4 is a schematic electrical circuit diagram illustrating the delayed closing device of the preferred embodiment.

Referring to FIG. 3, the preferred embodiment of a power supplying system according to the present invention is adapted for use with an ATX personal computer and is shown to include a power-supplying unit 30, a stand-by power source 31, a remote switching control circuit 32, a heat-dissipating fan 33 and a delayed closing device 34. The power-supplying unit 30 is connected to the stand-by power source 31, the remote switching control circuit 32 and the heat-dissipating fan 33. The stand-by power source 31 includes a switching and isolating circuit 310 and an output circuit 311. The stand-by power source 31 provides electrical power needed to operate the remote switching control circuit 32, and is connected to the motherboard (not shown) of the ATX personal computer. The motherboard is connected to a remote switch (not shown). The remote switch can be a keyboard or a modem, and is operable to activate the remote switching control circuit 32 to control operation of the power-supplying unit 30 in a selected one of a remote OFF state or a remote ON state. When the power-supplying unit 30 is in the remote OFF state, the power-supplying unit 30 cuts off its supply of electrical power to the heat-dissipating fan 33. However, the stand-by power source 31 continues to operate at this time to supply the electrical power needed by the remote switching control circuit 32 to permit activation of the remote switching control circuit 32 for resuming operation of the power-supplying unit 30 in the remote ON state. Referring to FIG. 4, the delayed closing device 34 is connected to the heat-dissipating fan 33, the stand-by power source 31 and the power-supplying unit 30. A first protective isolating component (D1) interconnects the power-supplying unit 30 and the heat-dissipating fan 33. A second protective isolating component (D2) interconnects the delayed closing device 34 and the heat-dissipating fan 33. In this embodiment, the first and second protective isolating components (D1, D2) are diodes. In use, when the power-supplying unit 30 supplies electrical power to the heat-dissipating fan 33, the second protective isolating component (D2) prevents electrical current from the heat-dissipating fan 33 from flowing into the delayed closing device 34. When the power-supplying unit 30 ceases to supply electrical power to the heat-dissipating fan 33, the first protective isolating component (D1) prevents electrical current supplied to the heat-dissipating fan 33 by the delayed closing device 34 from flowing into the power-supplying unit 30.

The delayed closing device 34 of the preferred embodiment includes a temperature sensing circuit 4, a timer 5, a controller 6 and a fan driving circuit 7.

The temperature sensing circuit 4 includes a temperature sensor 40 and a comparator 41. In this embodiment, the temperature sensor 40 is a thermal resistor but is not limited thereto. The temperature sensor 40 generates a sensor output that varies according to the ambient temperature (T). The comparator 41 receives the sensor output of the temperature sensor 40, and compares the same with an internal reference voltage (Vref) thereof that corresponds to a predetermined reference temperature (To). When the sensor output is greater than the reference voltage (Vref), indicating a condition in that the ambient temperature is greater than the reference temperature (T>To), the comparator 41 generates an overheating detect signal.

The timer 5 includes an oscillator (OSC) 50. In this embodiment, the oscillator 50 is a 555 integrated circuit but is not limited thereto. At the instant the power-supplying unit 30 is deactivated, the power-supplying unit 30 generates a power-off signal to the oscillator 50. At this time, the oscillator 50 starts executing a timing operation during which the oscillator 50 generates a timing signal. After a predetermined time period has elapsed, the oscillator 50 will terminate generation of the timing signal.

The controller 6 includes two transistors (Q1, Q2) having base terminals that are connected to the oscillator 50 and the comparator 41, respectively. The emitter terminals of the transistors (Q1, Q2) are connected to the output circuit 311 of the stand-by power source 31 to receive an operating voltage therefrom. The collector terminals of the transistors (Q1, Q2) are coupled to each other. The controller 6 generates a driver enable signal at the collector terminals of the transistors (Q1, Q2) upon receiving the timing signal from the oscillator 50 and the overheating detect signal from the comparator 41 at the same time. The controller 6 does not generate the driver enable signal when it fails to receive the timing signal and the overheating detect signal simultaneously.

The fan driving circuit 7 includes a transistor (Q3) having an emitter terminal connected to the output circuit 311 of the stand-by power source 31, a base terminal connected to the controller 6, and a collector terminal connected to the heat-dissipating fan 33 via the second protective isolating component (D2). Upon receipt of the driver enable signal from the controller 6, the transistor (Q3) conducts, thereby connecting the output circuit 311 of the stand-by power source 31 to the heat-dissipating fan 33. As such, the heat-dissipating fan 33 can continue to operate even after the power-supplying unit 30 ceases to supply electrical power thereto. Thus, residual heat in the vicinity of the heat-dissipating fan 33 can be dissipated quickly to lower the ambient temperature of the power-supplying unit 30 and the ATX personal computer. The heat-dissipating fan 33 will be turned off when the oscillator 50 ends its timing operation, or when the comparator 41 stops generating the overheating detect signal.

Referring once again to FIGS. 3 and 4, at the instant the remote switch is operated to activate the remote switching control circuit 32 and operate the power-supplying unit 30 in the remote OFF state, the power-supplying unit 30 generates a power-off signal to the oscillator 50, thereby enabling the latter to initiate a timing operation during which the oscillator 50 generates the timing signal. At this time, if the ambient temperature (T) is higher than the reference temperature (To), the comparator 41 will generate the overheating detect signal. Since the controller 6 receives the timing signal and the overheating detect signal simultaneously, the controller 6 will generate the driver enable signal to enable the fan driving circuit 7 to interconnect the output circuit 311 of the stand-by power source 31 and the heat-dissipating fan 33. Thus, the heat-dissipating fan 33 continues to operate even after the power-supplying unit 30 ceases to supply electrical power thereto, as long as the ambient temperature (T) is higher than the reference temperature (To) and the oscillator 50 continues to generate the timing signal. Therefore, residual heat in the vicinity of the heat-dissipating fan 33 can be quickly dissipated to lower the ambient temperature of the power-supplying unit 30 and the ATX personal computer. As such, the objective of prolonging the service lives and increasing the reliability of electronic components within the vicinity of the heat-dissipating fan 33 can be achieved with the provision of the delayed closing device 34 of this invention.

When the ambient temperature (T) becomes lower than the reference temperature (To), or when the oscillator 50 terminates generation of the timing signal after the predetermined time period has elapsed, the controller 6 ceases to generate the driver enable signal, thereby disabling the fan driving circuit 7 to break electrical connection between the output circuit 311 of the stand-by power source 31 and the heat-dissipating fan 33. The heat-dissipating fan 33 ceases to operate at this time.

In the preferred embodiment, both of the conditions that the ambient temperature (T) is higher than the reference temperature (To) and the oscillator 50 continues to generate the timing signal must be satisfied for continued operation of the heat-dissipating fan 33 when the power-supplying unit 30 is operated in the remote OFF state. It should be noted that the objective of the present invention can still be met even if continued operation of the heat-dissipating fan 33 occurs when only one of the conditions, i.e. the ambient temperature (T) is higher than the reference temperature (To) or the oscillator 50 generates the timing signal, is satisfied. Thus, only one of the temperature sensor 4 and the oscillator 5 is present in other embodiments of the delayed closing device of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A power supplying system, comprising:

a power-supplying unit;

a heat-dissipating fan connected to said power-supplying unit;

a stand-by power source;

a switching control circuit connected to said stand-by power source so as to receive electrical power therefrom, said switching control circuit being further connected to said power-supplying unit and being adapted to be activated to control operation of said power-supplying unit in a selected one of an ON state, where said power-supplying unit supplies electrical power for operating said heat-dissipating fan, and an OFF state, where said power-supplying unit ceases to supply the electrical power to said heat-dissipating fan; and a delayed closing device connected to said power-supplying unit, said heat-dissipating fan and said stand-by power source, said delayed closing device receiving a power-OFF signal from said power-supplying unit at an instant said power-supplying unit is operated from the ON state to the OFF state, said delayed closing device connecting said heat-dissipating fan to said stand-by power source upon receiving the power-OFF signal to enable said heat-dissipating fan to receive electrical power from said stand-by power source and permit continued operation of said heat-dissipating fan even after said heat-dissipating fan ceases to receive the electrical power from said power-supplying unit;

wherein said delayed closing device comprises:

a temperature sensing circuit for generating an overheating detect signal when ambient temperature exceeds a predetermined reference temperature;

a timer connected to said power-supplying unit and enabled by the power-off signal from said power-supplying unit to execute a timing operation during which said timer generates a timing signal, said timer terminating generation of the timing signal after a predetermined time period has elapsed;

a controller connected to said temperature sensing circuit and said timer, said controller generating a driver enable signal when said controller receives the overheating detect signal and the timing signal simultaneously; and a fan driving circuit connected to said controller, said heat-dissipating fan and said stand-by power source, said fan driving circuit being enabled by the driver enable signal from said controller to connect said heat-dissipating fan to said stand-by power source.

2. The power supplying system as claimed in claim 1, wherein said temperature sensing circuit comprises:

a temperature sensor for generating a sensor output that varies according to the ambient temperature; and a comparator connected to said temperature sensor, said comparator comparing the sensor output of said temperature sensor with a reference voltage that corresponds to the reference temperature, said comparator generating the overheating detect signal when the sensor output is greater than the reference voltage, indicating a condition in that the ambient temperature exceeds the reference temperature.

3. The power supplying system as claimed in claim 1, wherein said timer includes an oscillator.

4. The power supplying system as claimed in claim 1, wherein said controller includes two transistors having base terminals respectively connected to said temperature sensing circuit and said timer, emitter terminals connected to said stand-by power source to receive an operating voltage therefrom, and collector terminals coupled to each other, said controller generating the driver enable signal at said collector terminals of said transistors.

5. The power supplying system as claimed in claim 1, wherein said fan driving circuit includes a transistor having an emitter terminal connected to said stand-by power source, a base terminal connected to said controller, and a collector terminal connected to said heat-dissipating fan, said transistor conducting upon receipt of the driver enable signal from said controller to interconnect said stand-by power source and said heat-dissipating fan.

6. A power supplying system, comprising:

a power-supplying unit;

a heat-dissipating fan connected to said power-supplying unit;

a stand-by power source;

a switching control circuit connected to said stand-by power source so as to receive electrical power therefrom, said switching control circuit being further connected to said power-supplying unit and being adapted to be activated to control operation of said power-supplying unit in a selected one of an ON state, where said power-supplying unit supplies electrical power for operating said heat-dissipating fan, and an OFF state, where said power-supplying unit ceases to supply the electrical power to said heat-dissipating fan; and a delayed closing device connected to said power-supplying unit, said heat-dissipating fan and said stand-by power source, said delayed closing device receiving a power-OFF signal from said power-supplying unit at an instant said power-supplying unit is operated from the ON state to the OFF state, said delayed closing device connecting said heat-dissipating fan to said stand-by power source upon receiving the power-OFF signal to enable said heat-dissipating fan to receive electrical power from said stand-by power source and permit continued operation of said heat-dissipating fan even after said heat-dissipating fan ceases to receive the electrical power from said power-supplying unit;

wherein said delayed closing device comprises:

a temperature sensing circuit for generating an overheating detect signal when ambient temperature exceeds a predetermined reference temperature;

a controller connected to said temperature sensing circuit, said controller generating a driver enable signal upon receiving the overheating detect signal from said temperature sensing circuit; and a fan driving circuit connected to said controller, said heat-dissipating fan and said stand-by power source, said fan driving circuit being enabled by the driver enable signal from said controller to connect said heat-dissipating fan to said stand-by power source.

7. The power supplying system as claimed in claim 6, wherein said temperature sensing circuit comprises:

a temperature sensor for generating a sensor output that varies according to the ambient temperature; and a comparator connected to said temperature sensor, said comparator comparing the sensor output of said temperature sensor with a reference voltage that corresponds to the reference temperature, said comparator generating the overheating detect signal when the sensor output is greater than the reference voltage, indicating a condition in that the ambient temperature exceeds the reference temperature.

8. The power supplying system as claimed in claim 6, wherein said fan driving circuit includes a transistor having an emitter terminal connected to said stand-by power source, a base terminal connected to said controller, and a collector terminal connected to said heat-dissipating fan, said transistor conducting upon receipt of the driver enable signal from said controller to interconnect said stand-by power source and said heat-dissipating fan.

9. A power supplying system, comprising:

a power-supplying unit;

a heat-dissipating fan connected to said power-supplying unit;

a stand-by power source;

a switching control circuit connected to said stand-by power source so as to receive electrical power therefrom, said switching control circuit being further connected to said power-supplying unit and being adapted to be activated to control operation of said power-supplying unit in a selected one of an ON state, where said power-supplying unit supplies electrical power for operating said heat-dissipating fan, and an OFF state, where said power-supplying unit ceases to supply the electrical power to said heat-dissipating fan; and a delayed closing device connected to said power-supplying unit, said heat-dissipating fan and said stand-by power source, said delayed closing device receiving a power-OFF signal from said power-supplying unit at an instant said power-supplying unit is operated from the ON state to the OFF state, said delayed closing device connecting said heat-dissipating fan to said stand-by power source upon receiving the power-OFF signal to enable said heat-dissipating fan to receive electrical power from said stand-by power source and permit continued operation of said heat-dissipating fan even after said heat-dissipating fan ceases to receive the electrical power from said power-supplying unit;

wherein said delayed closing device comprises:

a timer connected to said power-supplying unit and enabled by the power-off signal from said power-supplying unit to execute a timing operation during which said timer generates a timing signal, said timer terminating generation of the timing signal after a predetermined time period has elapsed;

a controller connected to said timer, said controller generating a driver enable signal upon receiving the timing signal from said timer; and a fan driving circuit connected to said controller, said heat-dissipating fan and said stand-by power source, said fan driving circuit being enabled by the driver enable signal from said controller to connect said heat-dissipating fan to said stand-by power source.

10. The power supplying system as claimed in claim 9, wherein said timer includes an oscillator.

11. The power supplying system as claimed in claim 9, wherein said fan driving circuit includes a transistor having an emitter terminal connected to said stand-by power source, a base terminal connected to said controller, and a collector terminal connected to said heat-dissipating fan, said transistor conducting upon receipt of the driver enable signal from said controller to interconnect said stand-by power source and said heat-dissipating fan.

12. A power supplying system, comprising:

a power-supplying unit;

a heat-dissipating fan connected to said power-supplying unit;

a stand-by power source;

a switching control circuit connected to said stand-by power source so as to receive electrical power therefrom, said switching control circuit being further connected to said power-supplying unit and being adapted to be activated to control operation of said power-supplying unit in a selected one of an ON state, where said power-supplying unit supplies electrical power for operating said heat-dissipating fan, and an OFF state, where said power-supplying unit ceases to supply the electrical power to said heat-dissipating fan;

a delayed closing device connected to said power-supplying unit, said heat-dissipating fan and said stand-by power source, said delayed closing device receiving a power-OFF signal from said power-supplying unit at an instant said power-supplying unit is operated from the ON state to the OFF state, said delayed closing device connecting said heat-dissipating fan to said stand-by power source upon receiving the power-OFF signal to enable said heat-dissipating fan to receive electrical power from said stand-by power source and permit continued operation of said heat-dissipating fan even after said heat-dissipating fan ceases to receive the electrical power from said power-supplying unit; and a first protective isolating component interconnecting said power-supplying unit and said heat-dissipating fan, and a second protective isolating component interconnecting said delayed closing device and said heat-dissipating fan, said first protective isolating component preventing electrical current supplied to said heat-dissipating fan by said delayed closing device from flowing into said power-supplying unit when said power-supplying unit ceases to supply the electrical power to said heat-dissipating fan, said second protective isolating component preventing electrical current from said heat-dissipating fan from flowing into said delayed closing device when said power-supplying unit supplies the electrical power to said heat-dissipating fan.

13. The power supplying system as claimed in claim 12, wherein at least one of said first and second protective isolating components is a diode.

* * * * *